J. PANIK AND S. CLEBO.
COMBINATION MILK BOTTLE RECEPTACLE AND MAIL BOX.
APPLICATION FILED JULY 23, 1921.
1,418,200.
Patented May 30, 1922.
2 SHEETS—SHEET 2.
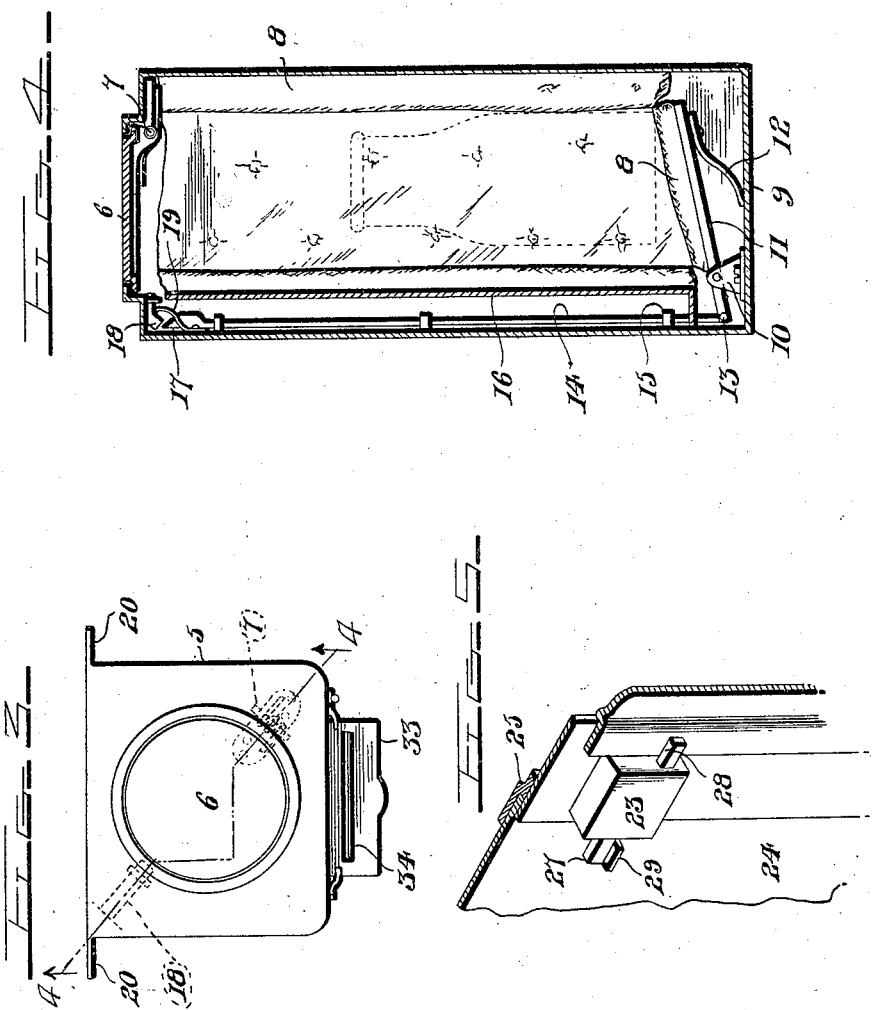
Inventors
Joseph Panik and
Steve Clebo
By F. K. Bryant.
Attorney

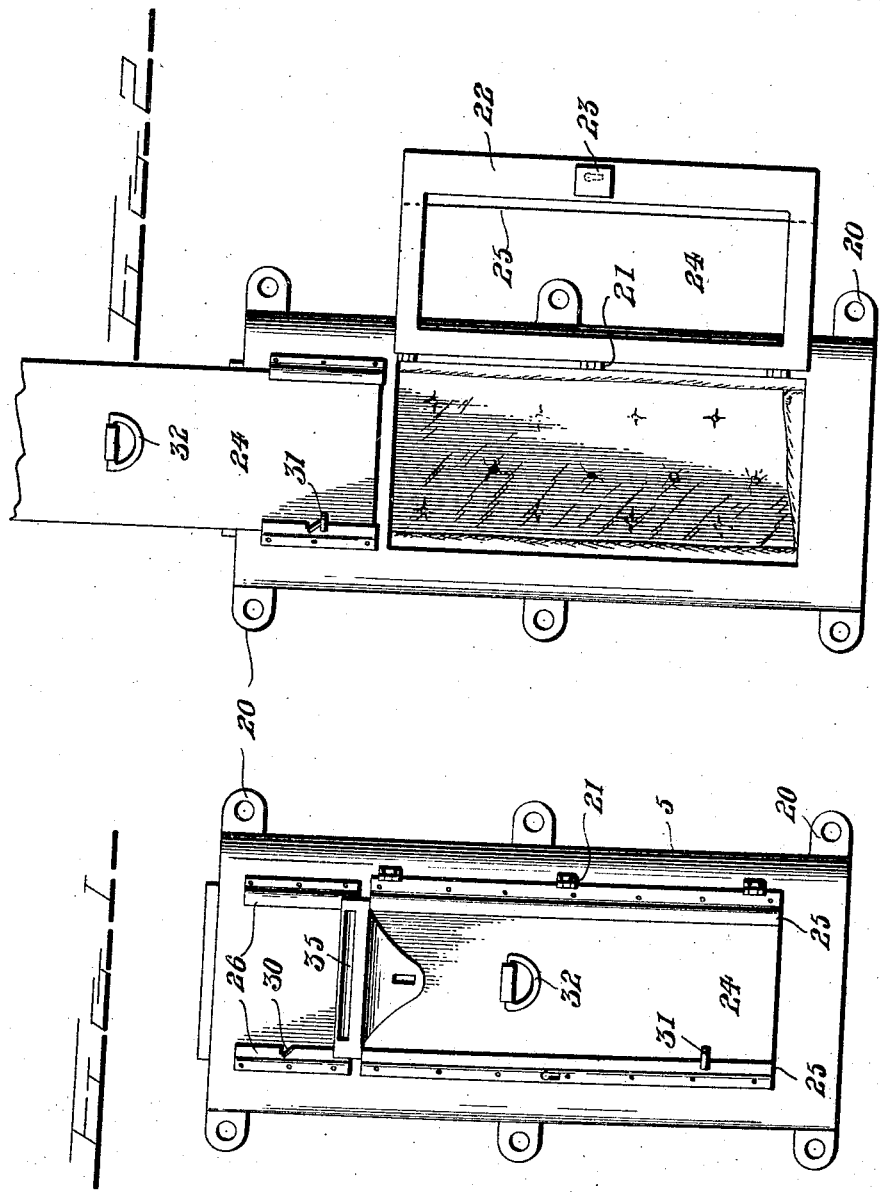

UNITED STATES PATENT OFFICE.

JOSEPH PANIK AND STEVE CLEBO, OF WEST PARK, OHIO.

COMBINATION MILK-BOTTLE RECEPTACLE AND MAIL BOX.

1,418,200.	Specification of Letters Patent.	Patented May 30, 1922.

Application filed July 23, 1921. Serial No. 487,012.

*To all whom it may concern:*

Be it known that we, JOSEPH PANIK and STEVE CLEBO, citizens of Czecho-Slovakia, residing at West Park, in the county of Cuyahoga and State of Ohio, have invented certain new and useful Improvements in Combination Milk-Bottle Receptacles and Mail Boxes, of which the following is a specification.

This invention relates to certain new and useful improvements in combination milk bottle receptacles and mail boxes of that type wherein provision is made for automatically locking the closure of the device when a milk bottle is placed therein.

The primary object of the invention is to provide a device of the above character wherein the receptacle is provided with improved means for preventing unauthorized access to the interior of the receptacle.

Another object of the invention is to generally simplify and improve devices of the present kind.

Other objects will appear as the nature of the invention is better understood and the same consists in the novel form, combination and arrangement of parts hereinafter more fully described and shown in the accompanying drawings, in which like designating characters refer to corresponding parts throughout the several views.

In the drawings,

Figure 1 is a front elevational view of a combined milk bottle receptacle and mail box constructed in accordance with the present invention and shown in locked condition, Figure 2 is a view similar to Figure 1 with the device in unlocked position and the vertically slidable panel elevated and shown partly broken away, Figure 3 is a top plan view of the device shown in Figure 1, Figure 4 is a vertical sectional view taken substantially upon line 4—4 of Figure 3, and Figure 5 is a fragmentary perspective view showing the panel and door locking means.

Referring more in detail to the several views, the present invention preferably embodies a vertically elongated receptacle or casing 5 having an opening in its top wall of sufficient size to admit a milk bottle therethrough and closed by means of a hinged cover 6 which is normally retained in closed position by the provision of a spring hinge 7, the cover 6 being of larger size than said opening so that said cover can be only opened by swinging the same downwardly and inwardly of the casing 5 against the action of said spring hinge. The walls of the casing 5 are preferably padded in any suitable manner as generally indicated at 8 and the bottom wall 9 has a bracket 10 fixed thereon to which a false bottom 11 is pivoted upon a horizontal axis, which false bottom is normally maintained in a tilted position by means of a spring 12 carried by the false bottom and bearing upon the true bottom 9. The normally lower end portion of the false bottom 11 is pivoted as at 13 to the lower end of a vertically slidable push rod 13 which is suitably guided by means of guide loops 15 rigidly fastened upon one of the side walls of the receptacle 5 between said wall and a false corner wall 16 whereby the milk bottle is prevented from interfering with or contacting said push rod 14.

The upper end of the rod 14 is beveled as at 17 and terminates near the upper wall or top of the receptacle 5 in close proximity to the angularly arranged end of a sliding bolt 18 which is mounted in a suitable keeper fixed to the top of said receptacle, which bolt is disposed to slide into position beneath the marginal portion of the cover 6 for preventing inward opening of said cover and which is normally retracted for permitting opening of said cover by means of a spring 19, the movement of the bolt 18 to locking position being effected by the rod 14 when the same is raised by reason of the tilting of the false bottom 11 when a milk bottle is placed thereon, the weight of said bottle being sufficient to overcome the springs 12 and 19. The casing 5 is preferably provided with a number of ears 20 through which screws or the like may be passed for rigidly fastening the device to the door frame of a dwelling in position to be conveniently reached by the milk man or post man as is usual with devices of this kind.

The front wall of the casing or receptacle 5 is provided with an opening sufficiently large to permit withdrawal of the milk bottle and this opening is adapted to be closed by means of a door including an open rectangular frame 22 hinged to the casing along one side by means of suitable hinges 21. This door is provided with a suitable lock actuatable by a key and disposed at the other side of the frame as at 23, and said door also includes a vertically movable panel which is slidable upon the outer face of the frame 22 between the latter and a pair of sheet metal guides 25 which are secured to the side members of the frame 22 in parallel relation and a somewhat similar pair of guide members of shorter length which are fastened to the front wall of the casing 5 as at 26 with each of said guides 26 alined with one of said guides 25 and arranged above the opening closed by the hinged door including the frame 22. The lock 23 is of that type embodying a pair of oppositely extending bolts 27 and 28 which are simultaneously retracted or projected by the key, and the arrangement is such that the bolt 28 will engage behind the front wall of the casing 5 when projected to prevent opening of the front door of the receptacle, while an inwardly extending leg 29 is provided upon the panel 24 so as to be engaged beneath the bolt 27 when said panel is lowered whereby said panel is prevented from being raised. The panel 24 is of sufficient length to completely close the opening of the frame 22 when locked and to also engage the guide members 26 so as to assist the bolt 28 in preventing opening of the front door of the casing as shown in Figure 1 and thus said front door can only be opened after the panel 24 is raised as shown in Figure 2 out of the guide members 25 even though the bolts 27 and 28 may be retracted. One of the guide members 26 is provided with a notch as at 30 and the panel 24 is provided with a spring catch 31 which will automatically spring into said notch when the panel 24 is elevated so as to hold said panel in this elevated position, while the panel 24 may be lowered by simply depressing the catch 31 out of said notch 30.

A suitable handle may be provided as at 32 on the panel 24 for convenience in raising the latter, and the upper portion of said panel is enlarged or depressed outwardly so as to provide a hollow head communicating with the interior of the receptacle 5 through the opening in the frame 22. The enlarged upper end or head of the panel 24 is indicated by the numeral 33 and may be slotted in its top wall as at 34 or in its front wall as at 35 for permitting insertion of letters or postal cards by the post man. The catch 31 is of a spring nature so as to frictionally engage one of the guides 25 and prevent the panel from sliding too freely, and the head 33 of the panel 24 is arranged to engage the upper ends of the guides 25 so as to properly limit the downward movement of the panel 24. As multiple bolt locks similar to that indicated by 23 are of common and well known form, the operating mechanism of the bolts is not shown but may consist of a key actuated pinion meshing with rack teeth formed on the overlapping inner ends of the bolts 27 and 28 if desired. However, this does not form a part of the present invention and disclosure of the same is therefore deemed unnecessary.

In operation, the parts are normally disposed as shown in Figures 1 and 4 and mail matter may be readily inserted in either of the slots 34 or 35 while a milk bottle may be readily placed within the casing 5 by forcibly depressing the cover 6. When the pivoted false bottom 11 receives the weight of the milk bottle, said false bottom is tilted against the action of the spring 12 and thereby causes upward sliding of the rod 14 and by engagement of the beveled end 17 with the adjacent end of the bolt 18, said bolt is projected beneath the marginal portion of the cover 6 so that the latter is locked against opening. With the parts thus disposed, access to the milk bottle is prevented except by an authorized person having a key to manipulate the lock 23 whose bolts are projected as shown in Figure 5. Upon retracting the bolts 27 and 28, the panel 24 may be raised to the position shown in Figure 2 wherein the catch 31 engages the notch 30 for holding said panel elevated above the frame 22 so that said frame 22 may be swung to an open position for permitting ready withdrawal of the milk bottle. The opening in the frame 22 is preferably slightly smaller than the diameter of the milk bottle so that said frame must be swung open in order to withdraw said bottle.

From the foregoing description, it is believed that the construction and operation as well as the advantages of the present invention will be readily understood and appreciated by those skilled in the art.

Minor changes may be made without departing from the spirit and scope of the invention as claimed.

What is claimed as new is:

1. In a milk bottle receptacle of the class described, a casing provided with a top closure having means automatically operable upon insertion of a milk bottle within the casing for locking the same in closed position, said casing being provided with a side opening through which said milk bottle may be withdrawn, a door for said side opening including a hinged frame provided with vertical guide ways, a panel slidable in said guide ways for closing the opening of the frame, and means to simultaneously lock the frame in closed position and the panel in its position for closing the opening of the frame.

2. In a milk bottle receptacle of the class described, a casing provided with a top closure having means automatically operable upon insertion of a milk bottle within the casing for locking the same in closed position, said casing being provided with a side opening through which said milk bottle may be withdrawn, a door for said side opening including a hinged frame provided with vertical guide ways, a panel slidable in said guide ways for closing the opening of the frame, means to simultaneously lock the frame in closed position and the panel in its position for closing the opening of the frame, said last named means comprising a multiple bolt key actuated lock carried by the frame with one of its bolts disposed to engage behind the adjacent wall of the casing and a lug upon the panel disposed to engage beneath the other bolt of said lock.

3. In a milk bottle receptacle of the class described, a casing provided with a top closure having means automatically operable upon insertion of a milk bottle within the casing for locking the same in closed position, said casing being provided with a side opening through which said milk bottle may be withdrawn, a door for said side opening including a hinged frame provided with vertical guide ways, a panel slidable in said guide ways for closing the opening of the frame, means to simultaneously lock the frame in closed position and the panel in its position for closing the opening of the frame, said panel being provided with a mail receiving slot communicating with the interior of the receptacle.

4. In a milk bottle receptacle of the class described, a casing provided with a top closure having means automatically operable upon insertion of a milk bottle within the casing for locking the same in closed position, said casing being provided with a side opening through which said milk bottle may be withdrawn, a door for said side opening including a hinged frame provided with vertical guide ways, a panel slidable in said guide ways for closing the opening of the frame, means to simultaneously lock the frame in closed position and the panel in its position for closing the opening of the frame, said panel being provided with an enlarged hollow head arranged to engage the guide members to limit the downward movement of the panel, and said head being provided with a mail receiving slot communicating with the interior of the casing.

5. In a milk bottle receptacle of the class described, a casing provided with a top closure having means automatically operable upon insertion of a milk bottle within the casing for locking the same in closed position, said casing being provided with a side opening through which said milk bottle may be withdrawn, a door for said side opening including a hinged frame provided with vertical guide ways, a panel slidable in said guide ways for closing the opening of the frame, means to simultaneously lock the frame in closed position and the panel in its position for closing the opening of the frame, guide members for the panel fixed upon the front wall of the casing above the door frame, and means to retain the panel elevated above said door frame within the last named guide members.

6. In a milk bottle receptacle of the class described, a casing provided with a top closure having means automatically operable upon insertion of a milk bottle within the casing for locking the same in closed position, said casing being provided with a side opening through which said milk bottle may be withdrawn, a door for said side opening including a hinged frame provided with vertical guide ways, a panel slidable in said guide ways for closing the opening of the frame, means to simultaneously lock the frame in closed position and the panel in its position for closing the opening of the frame, guide members for the panel fixed upon the front wall of the casing above the door frame, said panel being of sufficient length to engage the last named guide members when closing the opening of said frame whereby the frame is prevented from being opened until said panel is sufficiently raised to be disengaged from the guide members of the door frame.

In testimony whereof we affix our signatures.

JOSEPH PANIK.
STEVE CLEBO.